United States Patent [19]

Buell

[11] 4,058,273
[45] Nov. 15, 1977

[54] INFLATABLE CORE WIRE REEL

[76] Inventor: Donald D. Buell, Ilikai Hotel, 1777 Ala Moana Blvd., Apt. No. 1613, Honolulu, Hawaii 96815

[21] Appl. No.: 655,455

[22] Filed: Feb. 5, 1976

[51] Int. Cl.² .................... B65H 75/22; B65H 75/24
[52] U.S. Cl. .................................. 242/115; 242/71.9; 242/72 B; 242/118.2; 242/129
[58] Field of Search .................. 242/115, 118.4, 118.7, 242/118.62, 72 B, 118.2, 118.1, 118.11, 77, 110, 86, 129, 71.9, 68.4, 78.6, 129.51, 116, 68.2, 85

[56] References Cited
U.S. PATENT DOCUMENTS

| 2,558,055 | 6/1951 | Meredith | 242/78.6 |
| 2,695,142 | 11/1954 | Fons et al. | 242/115 |
| 3,097,808 | 7/1963 | Williams | 242/68.2 |
| 3,139,242 | 6/1964 | Banlier | 242/72 B |
| 3,166,335 | 1/1965 | Mason | 242/72 B |

Primary Examiner—George F. Mautz
Attorney, Agent, or Firm—William B. Walter

[57] ABSTRACT

An improved means to facilitate handling and use of loose coils of electrical wiring consists of a knockdown reel featuring a removable inflatable core, end flanges, a shaft or stub shafts, and adjustable width shaft bearing supports.

9 Claims, 13 Drawing Figures

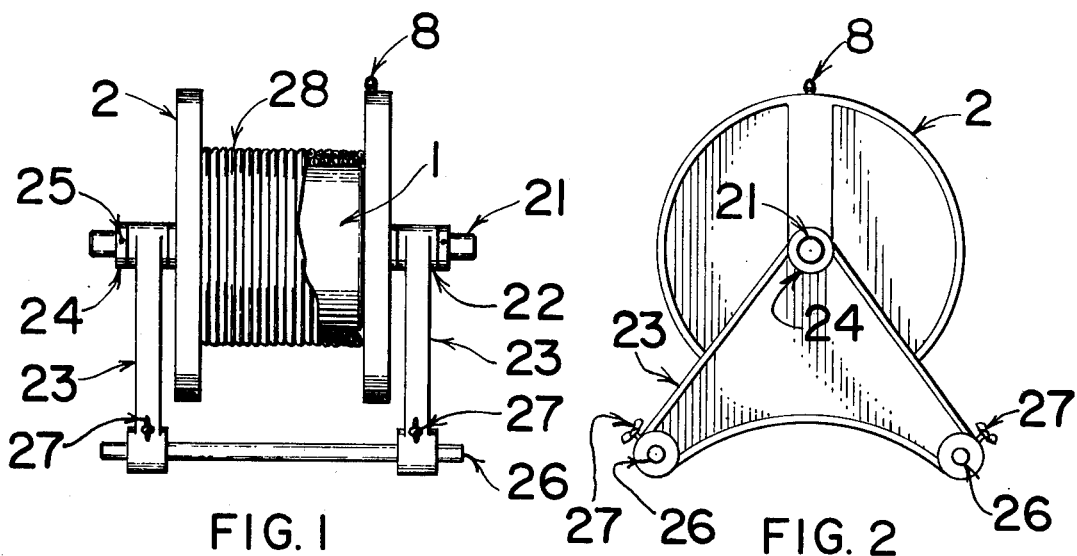
FIG. 1    FIG. 2
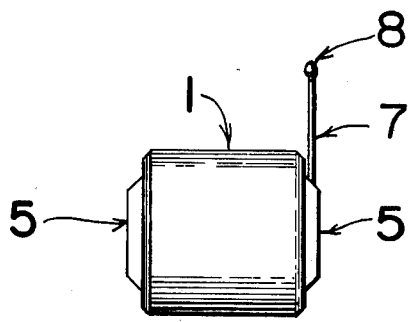    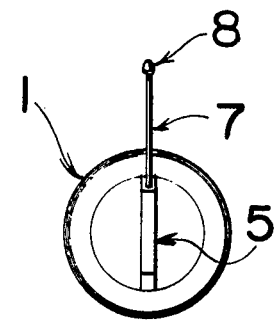
FIG. 3    FIG. 4
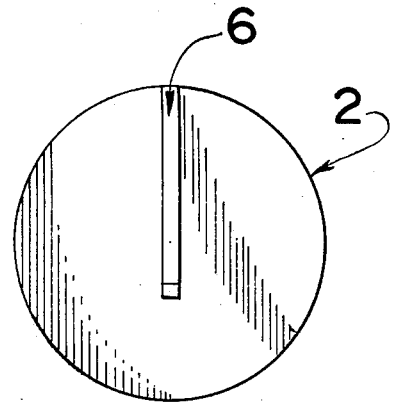    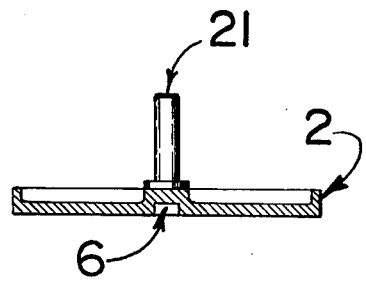
FIG. 5    FIG. 6

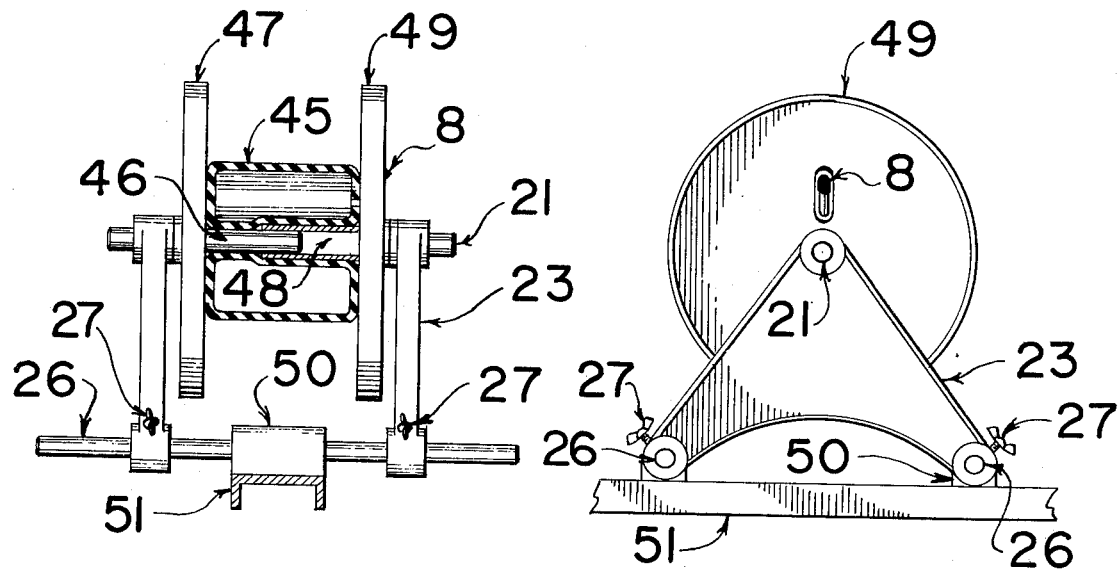
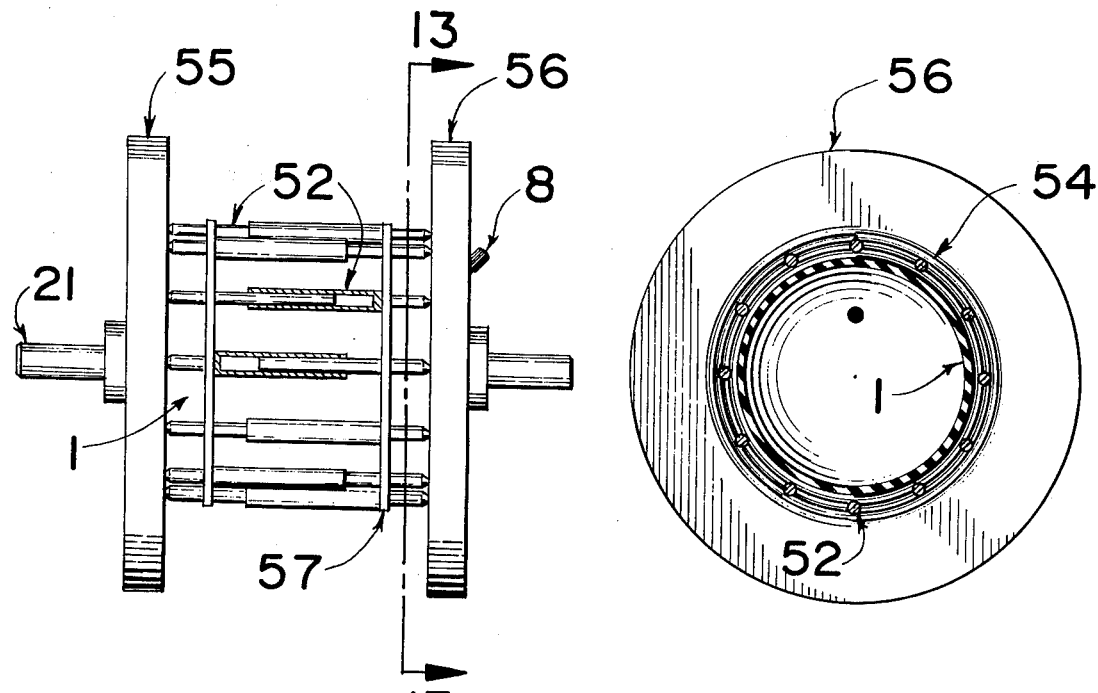

INFLATABLE CORE WIRE REEL

BACKGROUND

Electricians find it difficult and clumsy to handle the plastic covered wire which is supplied in coils up to 1,000 feet in length because it is not supported on spools. As the wire is paid out into a conduit, it tends to retain its coiled shape thus creating friction in the conduit as well as leaving a snarled coil remnant. In order to reduce these problems, the electricians often take the time to attempt to remove the wire from the coil and lay it out straight on the floor, but to do so requires the efforts of two men.

Simple solid core knockdown flanged reels inserted into the coils have not been satisfactory because of the looseness of the coiled wire and the non-uniformity of inside diameter and thickness of the coils. When wire is pulled off a coil mounted on such a knockdown reel, the outer wire often pulls down into the coil to wedge between the lower turns and thus binds. A heavy and complicated pivoted arm expandable reel has been found impractible because of its weight, cost and cumbersome operation.

An example of a mechanically expandable reel for coils of wire is shown in U.S. Pat. No. 1,451,131 to Weber. Although Banlier in U.S. Pat. No. 3,139,242 has shown an expandable core support for packages of yarn, it does not appear to be applicable to wire coils since end flanges, shaft and adjustable width bearing supports have not been shown or suggested.

A need for a simple and easily maintained expandable core reel for wire coils has thus been experienced and yet not been met by the prior art.

BRIEF SUMMARY OF THE INVENTION

The object of this invention is to provide a simple and effective means to facilitate the handling of coils of wire by electricians. This invention consists of a knockdown reel for wire coils which reel has an inflatable core, separate end flanges, and adjustable width flange bearing supports.

BRIEF DESCRIPTION OF THE DRAWINGS

In the drawings,

FIG. 1 is an elevation of the side of a preferred form of my improved knockdown reel for wire coils with the wires shown in cross-section to more clearly show the construction of the reel.

FIG. 2 is an elevation of the end of the reel as shown in FIG. 1.

FIG. 3 is a side view of the inflatable core of the reel of FIGS. 1 and 2, and FIG. 4 is an end view of the core of FIG. 3.

FIG. 5 is an end view of the inside face of the end flanges of the reel of FIGS. 1 and 2, and FIG. 6 is a plan view of the end flange of FIG. 5.

FIGS. 10 and 11 are a partial sectional end elevation and a side elevation respectively of another version of my invention in which the inflatable core is an open cylindrical form with inflatable walls thus allowing the use of an axial support member.

FIG. 12 is a side elevation of the inflatable core and end flanges of another version of my invention featuring axial stiffeners on the outside wall of the inflatable core.

FIG. 13 is a sectional view along the line 13—13 of FIG. 12.

DETAILED DESCRIPTION OF THE INVENTION

Figure 8:
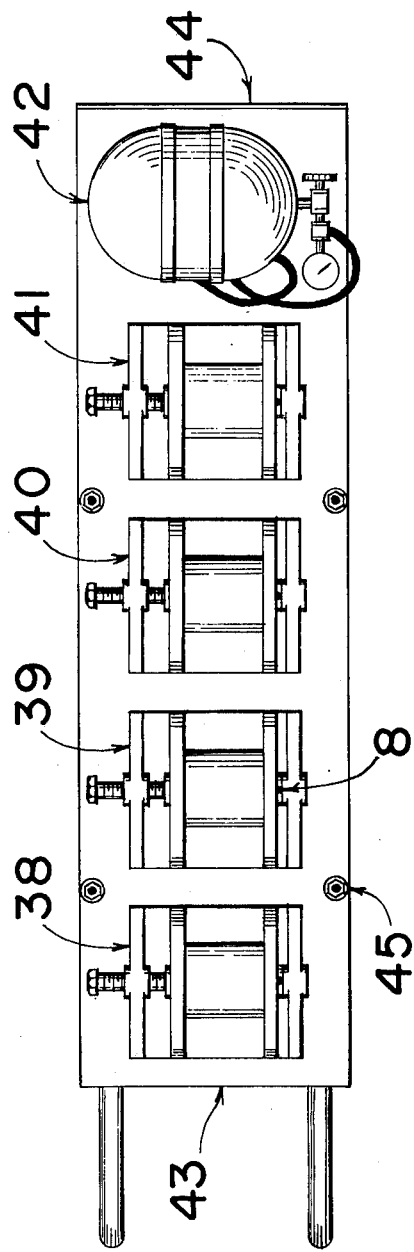
FIGS. 8 and 9 are a plan and a right hand side elevation respectively of a two wheel hand truck fitted out with four knockdown reels according to my invention.

In each of the versions described herein, the knockdown reel of this invention features an inflatable core 1, 30 or 45 which because of its flexibility may have its length and girth adjusted independently to fit the inside diameter and thickness of the wire coils 28 for which it has been devised. Thus the coils of wire are well supported for orderly removal of wire from the outside of the coils. The inflatable core 1, 30, or 45 is generally cylindrical as shown in each of the drawings. In the embodiment of the invention shown in FIGS. 1 through 6, the inflatable core 1 has a rib 5 at each end for engagement with slots 6 in the inner face of each of the end flanges 2. The inflatable core 1 can thus be coupled to end flanges 2 to form a flanged reel. A filler tube 7 with filler valve 8 is attached to the inflatable core 1 so as to fit within the slot of one of the end flanges 2.

In the versions shown in FIGS. 1 through 6, 10 and 11, and 12 and 13, the outside face of each of the end flanges 2, 47, 49, 55 and 56 has a stub shaft 21 which is supported for rotation in a bearing 22 in support arms 23. Bushings 24 with set screws 25 retain the flanges on support arms 23 so that in mounting and demounting the coils, the flanges 2 and support arms 23 are removed or replaced as a unit. Tie rods 26 shown in FIGS. 1, 2, 10 and 11 locked by set screws 27 to the base of each of the support arms 23 hold the support arms 23 and hence the end flanges 2, 47, 49, 55 and 56 in the desired spacing so as to adequately support the sides of the coils 28. The inflatable core 1 is thus positioned and held between the pair of end flanges 2 to form a knockdown flanged reel by the support bracket formed by support arms 23 and tie rods 26 holding flanges 2 against the ends of the inflatable core 1 as positioned by the ribs 5 on the ends of core 1 fitting within slots 6 in the inner faces of flanges 2.

Figure 7:
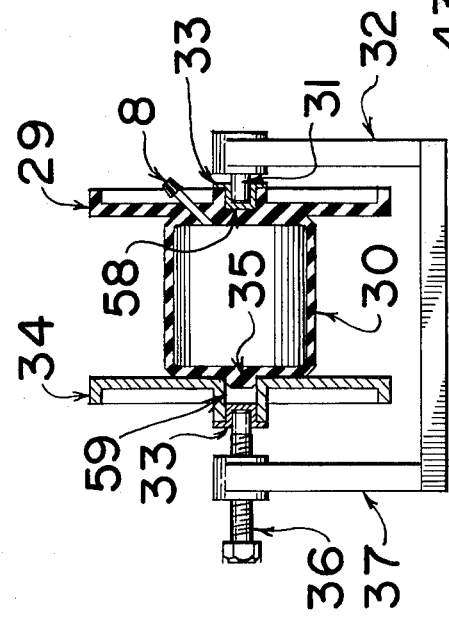
FIG. 7 is a partial sectional view of a knockdown reel according to my invention in which the inflatable core is integral with one flange.

In the embodiment shown in FIG. 7, the right hand end flange 29 is integral with the inflatable spool 30. A stub shaft 31 in the right hand support bracket 32 bears on a metal or plastic liner 33 in a central bore 58 in the flange 29. A removable end flange 34 is coupled to the inflatable core 30 by an integral centering point 35 of the core 30 interfitting a central bore 59 in flange 34. threaded shaft 36 engaging a threaded bore in the support arm 37 serves as a screw jack as it engages a liner 33 in the central bore 59 of the flange 34 to position the flange 34 and the flange 29 against the sides of coils mounted on the core 30.

Figure 9:
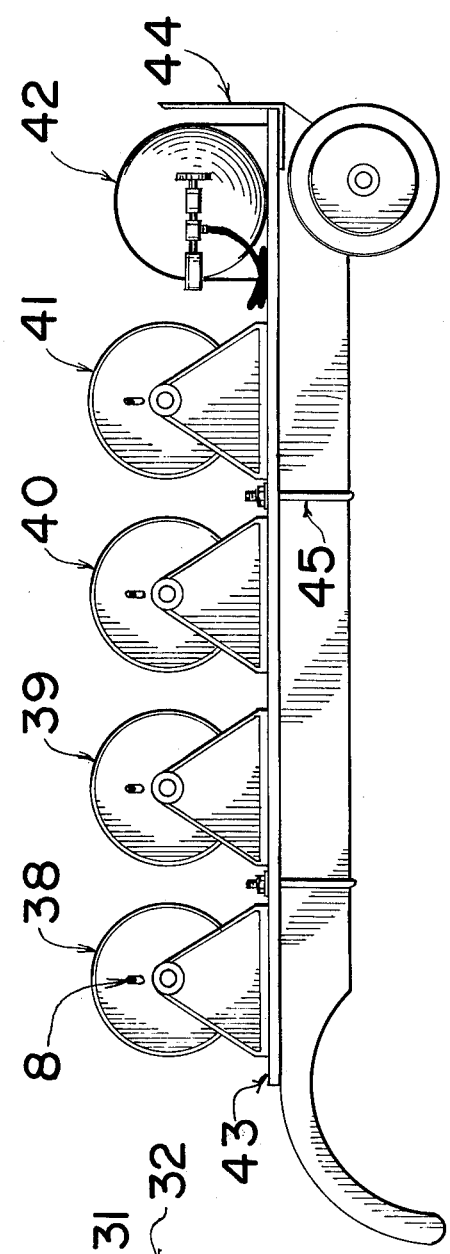

In FIGS. 8 and 9 are shown four knockdown reels 38, 39, 40 and 41 of the FIG. 7 version mounted with a compressed air supply 42 on a frame 43 which is attached to a two wheeled hand truck 44 by spring hooks 45. The compressed air supply may comprise a pressurized tank 42 as shown or a portable compressor. The hand truck wheels 46 are large enough for handling the truck on stairs and the hand truck is narrow enough to pass easily through doorways.

In FIGS. 10 and 11, the inflatable core 45 has a sealed central bore as in the inner tube of a tube type pneumatic tire. In this version, the load of the wire coils 28 on core 45 is well supported by a telescopic central shaft consisting of a stub shaft 46 on the left hand flange 47 fitting inside a hollow stub shaft 48 on the right hand flange 49. The support brackets 50 are used to attach each knockdown reel to a single beam 51 for multiple use as in FIGS. 8 and 9. Thus the core 45 of FIGS. 10 and 11 is positioned and held between the pair of end flanges 47 and 49 to form a knockdown flanged reel by the support bracket formed by support arms 23 and tie rods 26 holding flanges 47 and 49 against the ends of the inflatable core 45 as positioned by the stub shafts 46 and 48 intersecting the bore of core 45. Stub shafts 46 and 48 thus couple end flanges 47 and 49 to the inflatable core 45. As an alternate construction, a single shaft inserted through support brackets 23, end flanges 47 and 49 and inflatable spool 45 can be used to support the heavy coils 28 instead of shafts 46 and 48. In FIGS. 12 and 13 a series of telescopic struts 52 on the outside walls of the inflatable core 1 limit sagging of the core under load of the coils 28. Bands 57 hold struts 52 against inflatable core 1 as core 1 is inflated or deflated so that struts 52 can serve with the circumference of core 1 as beams to support the coil 28. Also bands 57 hold the tips of struts 52 close to the endwalls of inflatable core 1 so as to engage the grooves of end flanges 55 and 56 when the end flanges 55 and 56 are brought up against the sides of the coil 28. Thus the inflatable core 1 as in other embodiments, can be inflated and deflated to fit the inside diameter of the coils, and as the flanges 55 and 56 are moved in and out to fit the width of the coil 28, the core 1 fills the void between the flanges to fully support the coil 28. Each of the struts 52 has a pointed tip at each end which engages one of a series of concentric grooves 54 in the inside face of end flanges 55 and 56. Thus as flanges 55 and 56 are drawn up against the sides of the coil 28, the ends of struts 52 engage the faces of the flanges 55 and 56 so that each end of each strut is supported by the adjacent end flange. It is to be noted that the circumference of the core 1 is shown spaced from the struts 52 in the sectional view of FIG. 13 because of the rounded ends of the inflatable core at that section. The purpose of this section is to show the relationship of the strut ends 52 to grooves 54. A section in the major portion of the length of a core 1 would show the struts 52 held against the circumference of the core 1. Although not shown in FIGS. 12 and 13, coupling of the core 1 to the end flanges 55 and 56 co-axially can be accomplished in any one of a multitude of ways including those of the other Figures of these drawings.

METHOD OF OPERATION OF THE INVENTION

In using the knockdown reel as shown in FIGS. 1 through 6, the electician may, if he is about to mount a coil of approximately the same width as that used last on the reel, merely open the filler valve 8, releasing the air from the inflatable core 1. The core may then be removed from between the end flanges 2, slipped inside the center of the new coil 32, and the core 1 and coils 32 fitted into place between the end flanges 2. The core 1 may then be re-inflated to a pressure which will allow adequate support of the inside coils and the knockdown reel is ready for use. If the new coil 32 is either too wide or too thin to fit the former adjustment of the end flanges, the set screws 31 on one of the support arms 23 may be loosened to allow moving one of the end flanges 2 to suit and re-tightened. Thus when the set crews 27 on one support arm 23 are loosened, that support arm 23 may be slid on the tie rods 26 to position both end flanges against the sides of coil 28 and then the set screws 27 tightened to lock the loose support arm 23 in that position. This constitutes a simple means to vary the position of the end flanges so as to fully support the sides of coil 28. Then as the core 1 is inflated, filling the void between the flanges, coil 28 is fully supported for unwinding without binding on the sides and bore of the coil.

In the version of FIG. 7, mounting of the coils is accomplished by deflating core 30, fitting core 30 into the center of coils 28, placing core 30 and coils 28 on stub shaft 31 and flange 34, adjusting shaft 36 to draw flanges 34 and 29 against the sides of the coil 28, and finally inflating core 30 to support the inner turns of the coil 28. The adjusting screw or threaded shaft 36 thus is the means to vary the position of the end flanges so as to fully support the sides of coil 28 in this embodiment.

When the hand truck of FIGS. 8 and 9 is used by the electrician he has for ready use whatever variety of cables he desires and may feed from it up to four cables together into one conduit without the usual loss of time caused by twisting and tangling of the leads.

In order to install a new coil 28 on the reel of FIGS. 10 and 11, the electrician will first deflate core 45, remove the left hand support arm 23 with flange 47 from the assembly, then place the new coil 28 on the core 45. He will then replace the support arm 23 and flange 47 on the tie rods 26, sliding shaft 46 into shaft 48 until the coil 28 fits snugly between the end flanges. He then locks the support arm 23 to the tie rods 26 with set screws 27. The core 45 will then be inflated using air from the compressed air supply 42 to fit the inside of the coils 28.

My knockdown reel is thus easy to use, simple in construction, and easily adapted to wire coils which vary in inside diameter and width, fitting both to prevent binding of the turns upon paying out wire from the reel. In the version of FIGS. 12 and 13, the bands 57 being at the ends of the core 1 hold the pointed ends of the telescopic struts 52 in contact with the faces of the flanges 55 and 56. Since the struts 52 are telescopic, they accomodate changes in length of the core 1 to fit the width of the coil 28. Thus the principle of my invention, to fully support coils of wire having a variety of bore and width dimensions with a simple knockdown reel, has been met by the embodiments shown in which the sides are first supported by flanges which can be adjusted so as to be brought up against the sides of the coil and an inflatable coil which completely fills the void in the bore of the coil between flanges.

I claim:
1. A knockdown reel for coils of wire comprising:
 a. an inflatable core, said core, by selective inflation thereof, having an adjustable diameter to interfit the bore of wire coils and an adjustable length to match the axial length of wire coils;
 b. a pair of end flanges;
 c. a means to couple the end flanges to the ends of the inflatable core co-axially to form a flanged reel; and
 d. a supporting means operatively attached to said flanged reel for support and rotation of the reel thereon and said supporting means being operatively adjustable to accommodate variations in the length of the core and the corresponding distance between the flanges to position the flanges against the sides of the coil;

whereby wire from the fully supported coils may be successively removed from the coils without binding.

2. A knockdown reel for coils of wire as claimed in claim 1, wherein the inflatable core comprises:
   a. a cylindrical flexible walled container having an extended filler tube connected thereto; and
   b. a centering means operatively holding the flanges in co-axial arrangement with the cylindrical core.

3. A knockdown reel as claimed in claimed 1 wherein said means to couple the end flanges to the ends of the core comprises an outstanding rib provided on each end of the inflatable core, and the inside face of each flange being provided with a receiving slot for the adjacent rib of the inflatable core so that, when inserted, the ribs will align the core and the flanges co-axially.

4. A knockdown reel as claimed in claim 1 wherein each flange comprises a disc having a stub shaft on one face of the disc, the stub shaft being co-axial with the disc.

5. A knockdown reel as claimed in claim 1 wherein the means operatively attached to said flange reel for support and rotation of the reel thereon comprises:
   a. a first support arm operatively attached to one of the end flanges for rotation of the end flanges thereon;
   b. a second support arm operatively attached to the other end flange for rotation of the end flange thereon;
   c. a means operatively connecting the first support arm to the second support arm, such that the distance between end flanges may be varied.

6. A knockdown reel as claimed in claim 5 wherein the means operatively connecting the first support arm to the second support arm is attached to the first support arm by a means allowing selective positioning of the first support arm on the connecting means thus allowing adjustment of the distance between end flanges to effectively support the sides of the coil.

7. A knowndown reel as claimed in claim 1 wherein one of the pair of end flanges is integral with the inflatable core.

8. A knockdown reel as claimed in claim 1, wherein the inflatable core is in the shape of a hollow open ended cylinder with an inflatable wall and also comprising a central shaft operatively attached to the supporting means and inserted through the cylindrical core whereby when a coil of wire has been placed on the core between the end flanges and the core is inflated to fill the space between the central shaft and the coil, the central shaft will serve to limit sag of the inflated core due to the weight of the coil.

9. A knockdown reel for coils of wire comprising:
   a. an inflatable generally cylindrical core, said core, by selective inflation thereof, having an adjustable diameter to generally conform to the bore of wire coils and an adjustable length to match the axial length of wire coils;
   b. a pair of end flanges, the face of each end flange facing the core having concentric coaxial grooves;
   c. a multiplicity of circumferentially spaced telescopic struts arranged axially around the periphery of the core with each strut, toward the opposed ends thereof, being operatively attached to the core for expansion of the circumferentially spaced struts, against the bore of a wire coil placed on the core between the flanges, upon inflation of the core, the flanges being positioned against the sides of the coil, the struts being positioned at each end by engagement with the grooved flange faces and serving to limit sag of the core due to the weight of the coil; and
   d. a supporting means operatively attached to said flanged reel for support and rotation of the reel thereon, said supporting means being operatively adjustable to accommodate variations in the length of the core and the corresponding distance between the flanges to position the flanges against the sides of the coil;
   whereby wire from the fully supported coils may be successively removed from the coils without binding.

* * * * *